R. A. BATES.
VEHICLE WHEEL.
APPLICATION FILED FEB. 21, 1916.
1,200,297.
Patented Oct. 3, 1916.
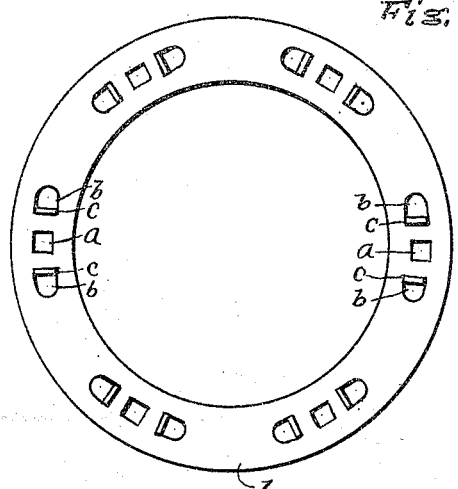
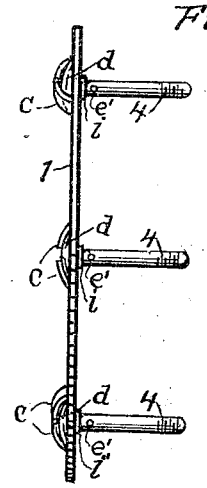
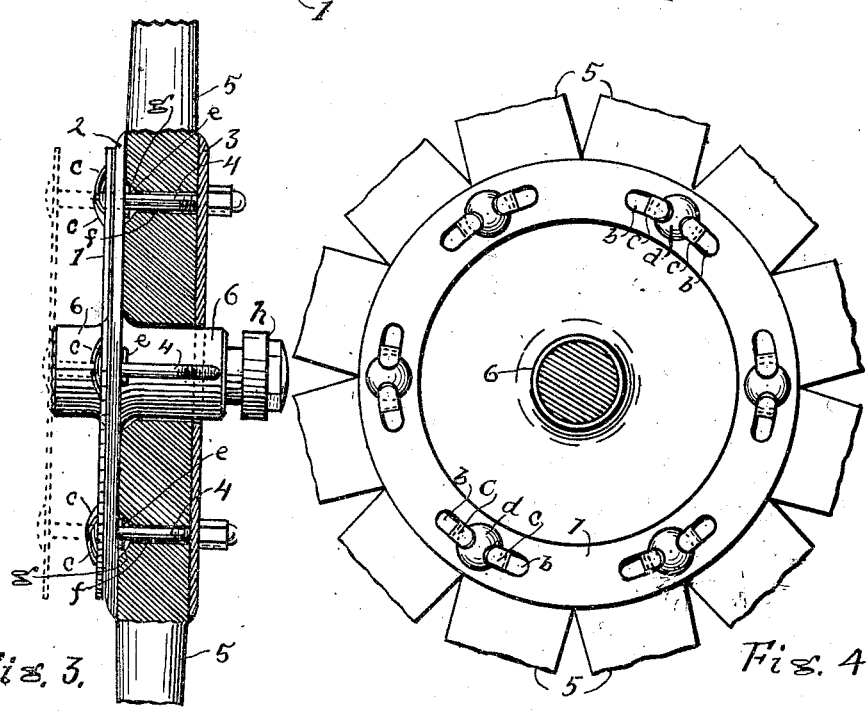
Inventor
Russell A. Bates.
By
Ethiel J. Cilley
Attorney

UNITED STATES PATENT OFFICE.

RUSSELL A. BATES, OF GRAND RAPIDS, MICHIGAN, ASSIGNOR OF ONE-HALF TO FREDERICK W. FRENCH, OF GRAND RAPIDS, MICHIGAN.

VEHICLE-WHEEL.

1,200,297.  Specification of Letters Patent.  Patented Oct. 3, 1916.

Application filed February 21, 1916. Serial No. 79,795.

*To all whom it may concern:*

Be it known that I, RUSSELL A. BATES, a citizen of the United States, residing at Grand Rapids, in the county of Kent and State of Michigan, have invented certain new and useful Improvements in Vehicle-Wheels, of which the following is a specification.

My invention relates to improvements in appliances for holding the bolts that secure demountable automobile wheels to the flange of the hub so that the wheel may be demounted and replaced without danger of the bolts getting out of proper position for easily entering the holes through the wheel hub, and its objects are: first, to provide a means whereby the retaining bolts will be held securely in normal position while the wheel is being taken off, repaired and replaced; second, to provide a means whereby the several bolts may be drawn backward through the hub flange without danger of dropping out of the flange or becoming disarranged so as to render their return through the wheel inconvenient, and, third, to provide a means whereby the bolts may be readily and securely held in place in the retaining element, or floating ring of the wheel and the whole may be applied without disfiguring the wheel or its hub. I attain these objects by the mechanism and construction shown in the accompanying drawing, in which:—

Figure 1 is a plan of the "floating ring" that is designed to hold the bolts in permanent position; Fig. 2 is an edge view of the same with the retaining bolts in place; Fig. 3 is a sectional side elevation of the hub and the adjacent ends of the spokes of an automobile wheel; Fig. 4 is a side elevation of the same showing the manner of securing the heads of the bolts to hold the bolts in permanent position.

Like characters refer to like parts in all views. In the accompanying drawing 1 represents what I term the "floating ring," and constitutes the essential feature of my invention.

2 represents the permanent flange of the hub 6, with which it is made integral, and constitutes the supporting element for the wheel proper.

3 is the removable flange which is made to pass on over the end of the hub; the spokes 5, 5 being placed between these two flanges and securely clamped in place by means of the retaining bolts 4, 4, in the usual manner.

To complete my invention I form bolt holes $a$, $a$ through the ring 1 in proper locations to receive and hold the bolts 4 so they will be held in positions to be readily and conveniently made to enter and pass through the holes through the flanges 2 and 3 and the spokes 5, as indicated in Fig. 3. At the same time I am forming the bolt holes $a$, $a$ through the ring 1 I form lugs $c$, $c$, adjacent thereto by stamping sections of the ring out of the openings $b$, $b$, so said flanges or lugs are integral with the ring, and may be bent over upon the convex surface of the bolt heads $d$, $d$ and thus firmly clamp the same to the ring 1, so the bolts 4, 4 must, at all times, stand at right angles with the ring and in permanent position to exactly correspond with the position of the holes $f$, $f$ through the flanges 2 and 3 and the spokes 5, 5.

While the ring 1 is designed to be in condition to be readily removed from the flange 2 when the bolts are released and the wheel removed, I find it advisable and in fact, necessary to so arrange the bolts 4, 4 that they will remain in position, with the ring 1 closely adjacent to the flange 2 when the wheel is being forced into place on the hub, and for this purpose I form countersinks, as indicated at $g$, $g$ in Fig. 3, in the sides of the spokes 5, 5, and pin holes $e'$ through the bolts 4 in position so that cotter pins $e$, $e$, passed through the holes $e'$ will bear upon the inner surface of the flange 2 and hold the bolts against any possible chance of being forced backward through the flange and thus inconvenience the operator in his efforts to replace the wheel.

As it is evident that other means, wholly within the scope of my invention, may be successfully employed to bring about the results herein stated, I do not desire to restrict myself to the exact construction herein described and shown, but do desire to secure the invention as broadly as the state of the art will admit.

With this construction I have so arranged the removable flange 3 that it, and the spokes 5, may be drawn off of the hub 6 without removing any part of the hub or the hub cap $h$.

To make the invention absolutely complete I prefer that the part of the bolt adjacent to the head $d$ be made of a form to fit the openings $a, a$ in the ring 1 so there will be no possibility of the bolt turning in its bearing under any circumstances, when the bolts are in place. This feature is illustrated at $i, i$ in Fig. 2.

What I claim as new, and desire to secure by Letters Patent of the United States, is:—

1. In combination with an automobile wheel hub and flanges, a floating ring having bolt holes formed therethrough corresponding with the positions of the bolt holes in the hub flanges, lugs formed integral with the floating ring adjacent to the bolt holes, bolts passed through the bolt holes, and the lugs on the ring pressed firmly over the heads of the bolts.

2. In combination with the wheel hub and flanges of an automobile, a metal floating ring having bolt holes formed therethrough corresponding with the bolt holes through the flanges on the hub, lugs struck outward from one side of the ring adjacent to the bolt holes, bolts passed through the bolt holes and secured therein by forcing the lugs firmly down against the heads of the bolts, said bolts having lateral holes therethrough, and cotter pins passed through said lateral holes adjacent to the inner surface of the permanent hub flange to prevent the ring from being forced away from the flange when the wheel is being placed upon the bolts.

3. In combination with the wheel hub and spokes, and the permanent flange of the hub, a floating ring having bolt holes therethrough corresponding with the bolt holes in the hub flanges and wheel spokes, bolts passed through the holes in the ring and through the hub flanges and wheel spokes, means for holding said bolts securely connected with the ring, and means for preventing the bolts from being forced out of the hub flange when the wheel is being placed upon the bolts.

4. In combination with the permanently located hub flange and retaining bolts of a vehicle wheel, a floating ring having means connected therewith whereby the bolts may be securely attached thereto to be held in permanent position to receive and secure the wheel hub to the permanent hub flange.

Signed at Grand Rapids Michigan February 18, 1916.

RUSSELL A. BATES.